Figure 4:
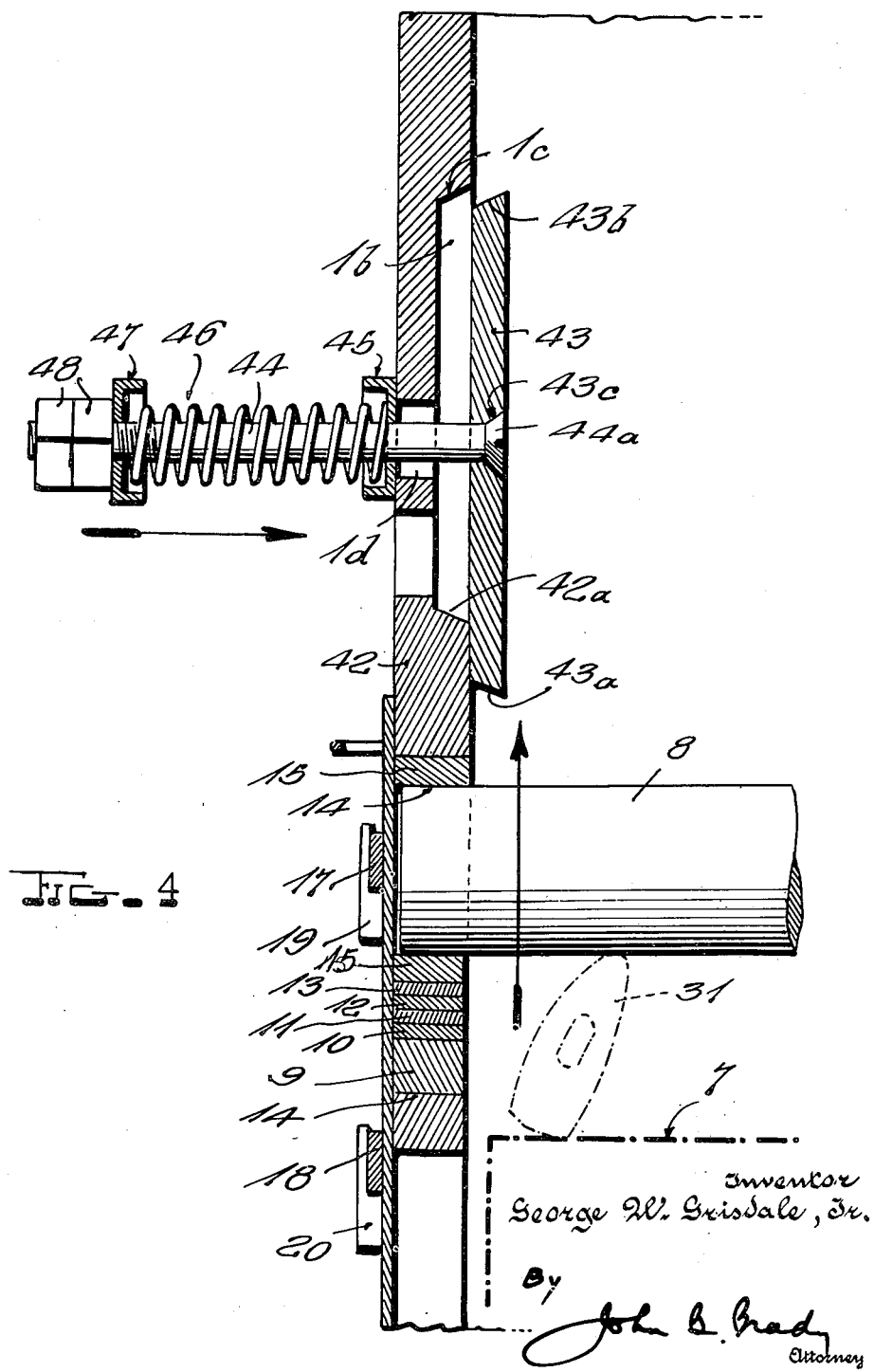

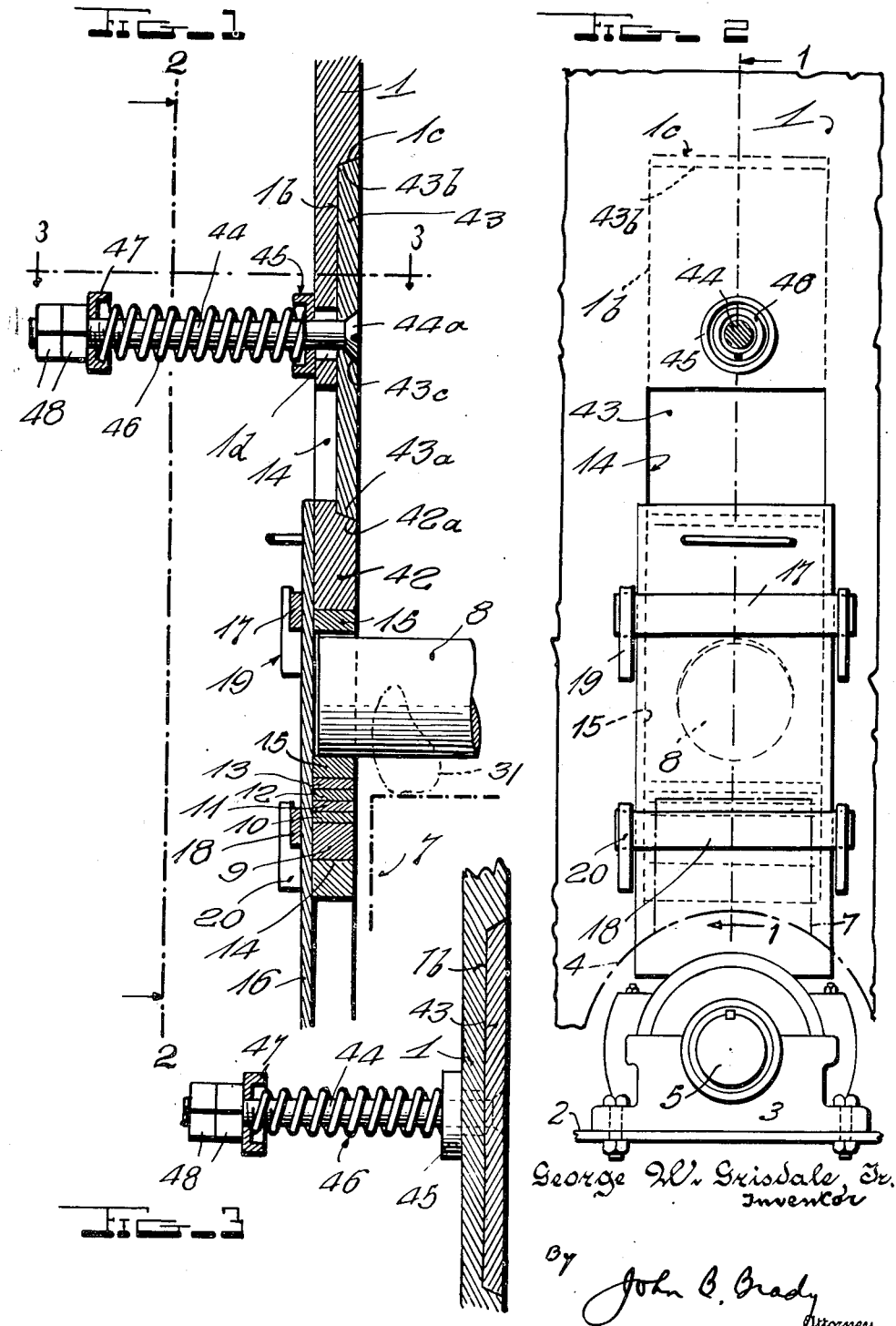

May 20, 1952 G. W. GRISDALE, JR 2,597,635
PROTECTIVE MECHANISM FOR ROTATING MACHINERY
Original Filed March 6, 1947 2 SHEETS—SHEET 2

Inventor
George W. Grisdale, Jr.
By John B. Brady
Attorney

Patented May 20, 1952

2,597,635

UNITED STATES PATENT OFFICE 2,597,635

PROTECTIVE MECHANISM FOR ROTATING MACHINERY

George W. Grisdale, Jr., Ephrata, Pa., assignor, by mesne assignments, of one-fourth to Lee H. Kessler, one-fourth to Norman H. Kessler, one-fourth to Nellie H. Kessler, and one-fourth to Harriet F. Derrick Original application March 6, 1947, Serial No. 732,849. Divided and this application June 12, 1950, Serial No. 175,558

5 Claims. (Cl. 241—286)

My invention relates broadly to rotating machinery and more particularly to means for protecting the rotating and stationary parts of machinery from damage when an unbreakable object is caught between the parts. This application is a division of my United States Patent No. 2,525,795 of October 7, 1950, for Protective Mechanism for Rotating Machinery.

One of the objects of my invention is to provide a compact construction of plate support for mounting stationary parts of a machine in operative relation to coacting rotating parts in such manner that under conditions of excessive pressure which may accompany the accidental catching of an unbreakable object between the rotating and stationary parts of the mechanism, yieldable displacement of the normally stationary parts may be effected without injury to the machinery by a shearing action of the plate support.

Another object of my invention is to provide an arrangement of yieldable abutment means for coacting rotating and stationary parts of a machine in which the abutment means may be displaced outwardly under conditions of excessive pressure against the normally stationary parts of the machine for allowing the rotating parts to continue to move without breakage until repairs and replacements can be effected.

Still another object of my invention is to provide a construction of safety device comprising a supporting plate with an angularly inclined edge adapted to coact with a complementary shaped edge of a recessed housing and mounted for lateral displacement for protecting expensive machinery containing rotating and stationary parts against damage due to obstructions whereby under conditions of excessive pressures the stationary parts may be displaced out of the path of the rotating parts to permit free and unrestricted movement of the rotating parts without damage pending repair of the equipment.

Other and further objects of my invention reside in the arrangement of protective means for rotating machinery as set forth more fully in the specification hereinafter following by reference to the accompanying drawings in which:

Figure 1 is a vertical sectional view through one of the end supports of a rotative machine showing the yieldable protective abutment for the stationary parts of the rotative machine and illustrating the manner of allowing yieldable displacement of the abutment under conditions where an unbreakable object may be caught between the coacting rotating and stationary parts of the machine the view being taken on line 1—1 of Fig. 2; Fig. 2 is a vertical sectional view taken substantially on line 2—2 of Fig. 1 and illustrating the support for the stationary parts of the machinery to be protected in end elevation; and Fig. 3 is a fragmentary horizontal sectional view taken substantially on line 3—3 of Fig. 1; and Fig. 4 shows the displacement of the yieldable abutment of Figs. 1, 2 and 3 under conditions in which an unbreakable object is caught between the rotating and stationary parts of the mechanism.

My invention is directed to the protection of rotating machinery generally where it is necessary in the interests of economy, maintenance and continuous operation of the rotating machinery to protect rotating and stationary parts from damage when an unbreakable object is accidentally caught between the parts. This is achieved by providing a mounting means for the stationary parts which permit the stationary parts to be displaced out of normal position under conditions of excessive force developed by the accidental catching of an unbreakable object between rotating and stationary parts whereby the space between the rotating and stationary parts may be greatly enlarged enabling the unbreakable object to be released and allowing the continued movement of the rotating part without obstruction or injury. My invention may be embodied in various forms and for purposes of illustration I have shown my invention embodied in a spring controlled yieldable abutment which may be displaced under conditions of excessive pressure to relieve the rotating or stationary parts from damaging obstructions. The protective structure of my invention saves long shutdowns of essential rotating equipment which when injured by accidental catching of unbreakable objects between the rotating and stationary parts require extended time and labor for replacement of damaged parts. Moreover, the protective mechanism of my invention saves very expensive equipment and parts thereof against injury and reduces maintenance costs.

In illustrating my invention herein I have shown the protective mechanism of my invention applied to stone crushing and breaking machinery, of the type shown in my aforesaid patent, but it will be understood that my invention is not restricted or limited to stone crushing or breaking machinery, but is applicable generally to any type of machinery containing rotating and stationary parts which are to be protected from damage when an unbreakable object is caught between the parts.

The numeral 1 indicates a fragmentary portion of an end wall of the stone crusher housing including a structural steel supporting frame 2 which provides mounting means for one or more bearings 3, each serving as a journal for a companion rotor or impeller 4 of the machine carried by a rotary shaft 5 operating within the housing and including breaker bars 7 extending substantially radially therefrom in coacting relation to a stationary or impact bar 8 arranged in a special manner with respect to the rotor bars by means of insertable spacer blocks 9, 10, 11, 12 and 13 mounted in the lower end of a vertical guide-way or opening 14 in each end wall 1 of the housing for adjustably fixing the position of the upper or opposing stationary bar guide plate 15. This plate is substantially square and has a central opening therein to receive the opposing end of the impact bar 8, and is selectively fixed in its special relation to the path of movement of the revolving breaker bar 7 to position the stationary impact bar 8 in the desired breaking and crushing relation to such revolving bar. The spacer blocks and guide plate are retained in position by a cover plate 16 placed over the recess 14 and across which extends locking bars 17, 18 detachably engageable in latch brackets 19, 20 secured to the end wall 1.

In Figs. 1-4 I have illustrated my invention employing a safety release plate 42 fitted within the guideway in surmounting or abutting contact at its lower end with the guide plate 15 and having a shoulder 42a thereon for receiving the edge 43a of a retainer plate 43. Retainer plate 43 is mounted within recess 1b in housing 1 and has the upper edge 43b thereof conforming with an inclined edge portion 1c of housing 1. The retainer plate 43 is centrally apertured at 43c in alignment with an aperture 1d in housing 1. Aperture 43c has an inclined internal wall portion for receiving the annular inclined head 44a of bolt member 44 which projects through aperture 1d in housing 1 and through cup-shaped retainer member 45 which yieldably abuts the interior wall of housing 1 and through the compression coil spring 46 and through cup-shaped retainer member 47 where it is secured by nut members 48. The nut members 48 may be adjusted on the screw-threaded end of bolt 44 for securing various operating spring pressures in meeting various operating conditions and stone hardness when the system of my invention is employed in a stone crusher. The degree of compression of coil spring 46 will depend upon the adjustment of nuts 48 on the screw-threaded end of bolt 44.

As shown in Fig. 4 excessive pressure exerted against stationary or impact crusher bar 8 due to the wedging of an unbreakable object 31 between revolving breaker bar 7 and stationary or impact bar 8 results in shifting safety release plate 42 to a position in which shoulder 42a cants the inclined edge 43a of plate 43 toward the right against the yielding pressure established by compression coil spring 46. Continued displacement of safety release plate 42 continues to shift plate 43 inwardly within the crusher housing, the safety release plate 42 sliding beneath the outside surface of plate 43 while compression coil spring 46 continues to exert pressure tending to draw plate 43 toward the outside of housing 1. Ample displacement of stationary or impact bar 8 is permissible by this arrangement permitting the freeing of obstructions. The restoration of the apparatus utilizing the construction of Figs. 1-4 is simple and quick and a machine equipped with the safety mechanism of my invention may be restored to operating condition in a minimum of time after shut down.

For purposes of explaining my invention I have referred to but one side of the housing and to but one of the impellers therein. It will be understood that the structure shown herein is symmetrically applied to both sides of the housing and to both impellers operated within the housing.

I have found the protective arrangement of my invention highly practical and successful in operation and while I have described my invention in one of its preferred embodiments I realize that modifications may be made and I desire that it be understood that no limitations upon my invention are intended other than may be imposed by the scope of the appended claims.

What I claim as new and desire to secure by Letters Patent of the United States is as follows:

1. Rotating machinery comprising a supporting housing including an end wall having a guideway therein, a rotating member journaled in said housing in spaced relation to said guideway, a guide plate mounted in said guideway for displacement therein relative to said rotating member, a stationary member supported on said guide plate, a safety plate disposed in said guideway for movement therein and surmounting said guide plate, and laterally-displaceable means applied to said housing-wall in releasable retaining engagement at one end with the latter and at its other end with said safety plate and including a yieldable attaching element for normally retaining such means in substantially coplanar relation with the housing-wall and said guide plate.

2. Rotating machinery comprising a supporting housing including an end wall having a guideway therein, a rotating member journaled in said housing in spaced relation to said guideway, a guide plate mounted in said guideway for displacement therein relative to said rotating member, a stationary member supported on said guide plate, a safety plate disposed in said guideway for movement therein and surmounting said guide plate, and laterally-displaceable means applied to said housing-wall in releasable retaining engagement at one end with the latter and at its other end with said safety plate and including a yieldable attaching element for normally retaining such means in substantially coplanar relation with the housing-wall and said guide plate, the opposed engaging edges of said displaceable means and said safety plate being tapered to cause the lateral displacement of the former from the latter under conditions of excessive pressure between the stationary and rotating members to permit the displacement of the stationary member in a direction away from the rotating member.

3. Rotating machinery comprising a supporting housing including an end wall having a guideway therein, a rotating member journaled in said housing in spaced relation to said guideway, a guide plate mounted in said guideway for displacement therein relative to said rotating member, a stationary member supported on said guide plate, a safety plate disposed in said guideway for movement therein and surmounting said guide plate, a laterally-displaceable retainer plate applied to said housing-wall in releasable, taper-fit shouldered engagement at its upper end with such wall and at its lower end with said safety plate and having an attaching stud bolt projecting outwardly therefrom, and a compression spring surrounding said stud bolt and abutting against the housing-wall for yieldingly maintaining said retainer plate in substantially coplanar relation with said housing-wall.

4. Rotating machinery comprising a supporting housing including an end wall having a guideway therein, a rotating member journaled in said housing in spaced relation to said guideway, a guide plate mounted in said guideway for displacement therein relative to said rotating member, a stationary member supported on said guide plate, a safety plate disposed in said guideway for movement therein and surmounting said guide plate, the upper end of said safety plate having an inwardly-sloping shoulder thereon, a laterally-displaceable retainer plate applied to said housing-wall in shouldered engagement therewith at its upper end and having a sloping shoulder at its lower end for releasable engagement with the companion shoulder of the safety plate, a stud-like bolt on said safety plate extending outwardly through the housing-wall substantially normal thereto and having adjusting nuts at its outer end, and a compression spring applied to said stud bolt between said nuts and the housing-wall.

5. Rotating machinery comprising a supporting housing including an end wall having a vertical guideway therein and a recessed portion on the inner side thereof above such guideway and coextensive therewith, said recessed portion terminating at its upper end in a sloping shoulder, a rotating member journaled in said housing in spaced relation below said guideway, a guide plate disposed in the latter for vertical displacement therein, a stationary member supported on said guide plate, a safety plate in said guideway in surmounting relation to said guide plate and having a sloping shoulder at its upper end in opposing coplanar relation to the companion shoulder of the recessed portion of said end wall, and a laterally-displaceable retainer plate applied to said housing-wall and having its upper and lower ends in releasable retaining engagement with said wall and safety-plate shoulders, respectively, said retainer plate including a yieldable attaching means for normally retaining it in substantially coplanar relation with the housing wall and said safety plate.

GEORGE W. GRISDALE, Jr.

REFERENCES CITED

The following references are of record in the file of this patent:

UNITED STATES PATENTS

| Number | Name | Date |
|---|---|---|
| 174,719 | Clark | Mar. 14, 1876 |
| 480,660 | Farquhar | Aug. 9, 1892 |
| 1,590,305 | McLean | June 29, 1926 |
| 1,606,035 | Mitts | Nov. 9, 1926 |
| 1,735,823 | Huffman | Nov. 12, 1929 |
| 1,770,382 | Armstrong | July 15, 1930 |
| 1,772,321 | Ossing | Aug. 5, 1930 |
| 1,780,112 | Bowman | Oct. 28, 1930 |